April 21, 1959 A. MÖLLER ET AL 2,882,791
BINOCULAR TELESCOPE IN COMBINATION WITH A CAMERA
Filed March 25, 1955 2 Sheets-Sheet 1

Inventor:
Alfred Möller
Friedrich Klein
by: Michael S. Striker
agt.

April 21, 1959   A. MÖLLER ET AL   2,882,791
BINOCULAR TELESCOPE IN COMBINATION WITH A CAMERA
Filed March 25, 1955   2 Sheets-Sheet 2

Inventor:
Alfred Möller
Friedrich Klein
by: Michael S. Striker

United States Patent Office 2,882,791
Patented Apr. 21, 1959

2,882,791

BINOCULAR TELESCOPE IN COMBINATION WITH A CAMERA

Alfred Möller and Friedrich Klein, Wedel (Holstein), Germany, assignors to J. D. Moller Optische Werke G.m.b.H., Wedel (Holstein), Germany Application March 25, 1955, Serial No. 496,864

Claims priority, application Germany March 26, 1954

1 Claim. (Cl. 88—34)

Binocular telescopes in combination with a camera are known. For this purpose Galilean telescopes are used as well as teinoscopes. The two half-parts of the telescope are attached to the casing of the photographic camera either fixedly or—in case of teinoscopes—rotatably, on the whole or in part, to ensure adaptability to the distance of pupils. As far as it concerns these known combinations the placing of the camera is difficult, since the space between the two half-parts is insufficient for an easy handling of the film and the serving elements of the camera when using the telescope.

According to the invention the combination of the telescope with the camera is characterised in that the axis of the photoobjective and the shafts of the two rotatable telescopic half-parts form the corner points of an isosceles triangle, the ascending altitude of which amounts to at least 0.7 of the basis, and that the movable bars of the half-parts are coupled. This coupling is done by toothed segments of the sliding boxes gearing into each other.

According to the invention the axis of the photo-objective is bent giving thus the opportunity to place the film-reels and the shutter of the camera in superposed horizontal planes.

The shafts of the telescopic half-parts are hollow to take up the adjusting elements of the camera.

An embodiment of the invention is illustrated by way of example in the accompanying drawing in which.

Figure 3:
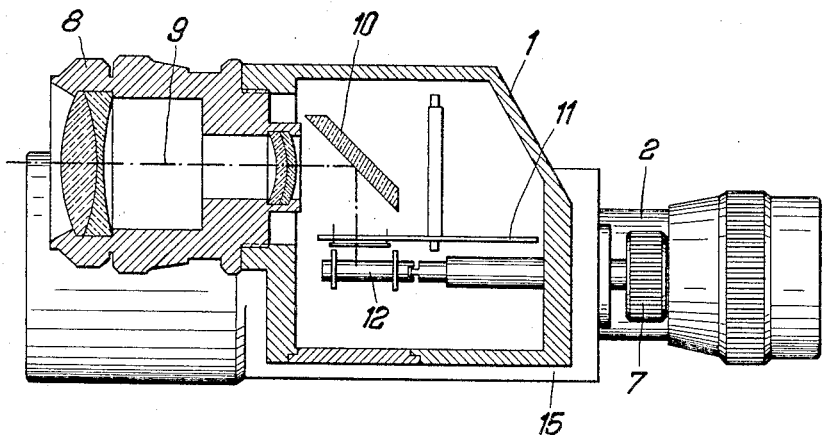
Figure 4:
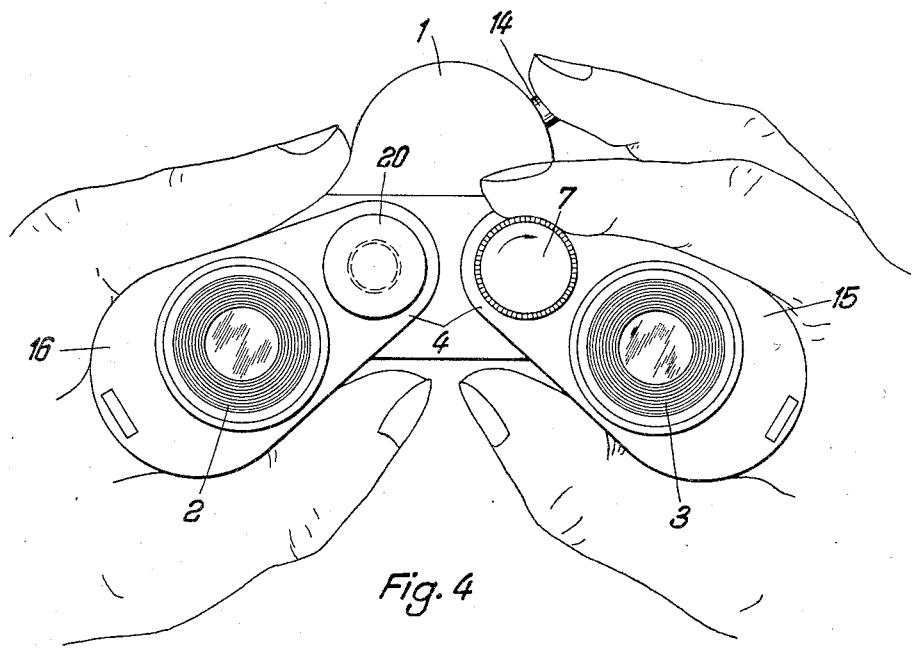

Fig. 3 a vertical section on the longitudinal centre-axis,

Fig. 4 the handling of both the telescope and the camera.

Figure 1:
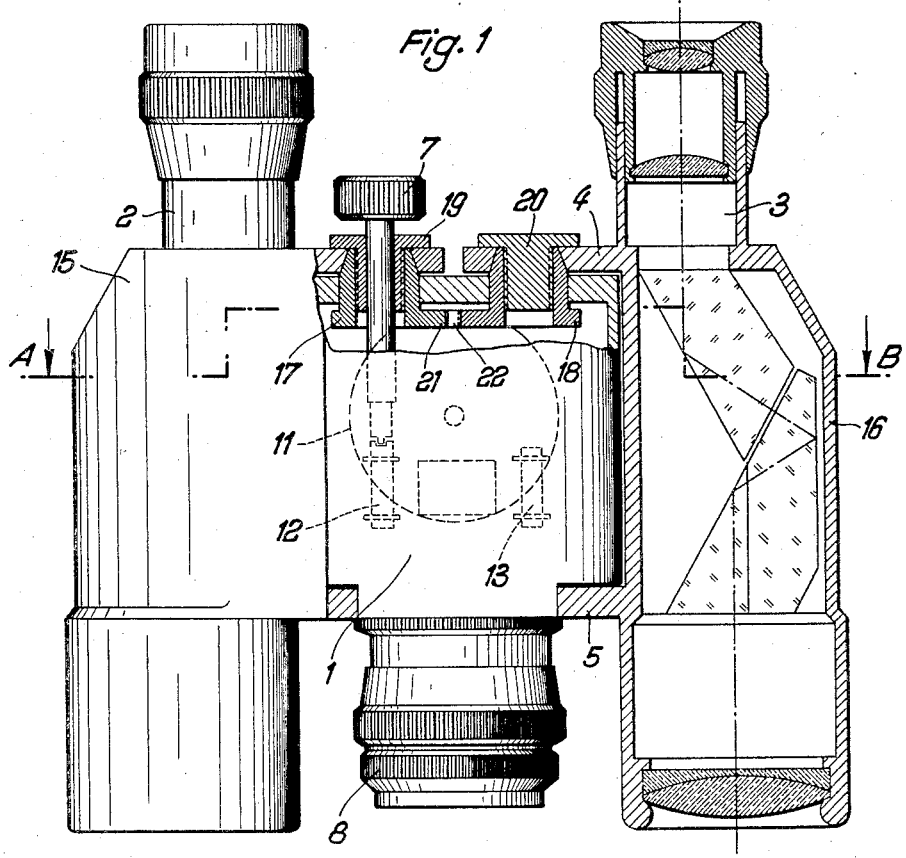
Fig. 1 shows a part-sectional plan-view of the combination.

Referring now to Fig. 1, 1 designates the camera, 2 and 3 are the telescopic half-parts. The camera 1 is connected with the half-parts 2, 3 by means of movable bars, 4, 5, which are rotatably attached to the casing 1.

The casing 1 is closed by itself. On normal use of the telescope the casing 1 lies by its better part above the telescopic plane and fills in the space between the two half-parts. The photo-objective 8 is placed into the upper part of the casing 1. The objective-axis 9 is bent by an optical member, in the illustrated embodiment by the mirror 10. The shutter 11 and the film-reels 12, 13 are placed in superposed horizontal planes.

The telescopic half-parts 2, 3 are provided with prismatic lens systems 15, 16.

The movable bars 4 are pivoted in the casing 1 by means of sliding boxes 17, 18. These sliding boxes have interlocking toothed segments 21, 22, being firmly connected to the movable bars 4 by screw-nuts 19, 20. The sliding boxes 17, 18 are hollow to take up the photographic adjusting elements, for instance the film-transporter 7. The disengaging knob 14 for the shutter 11 is placed into the casing 1.

Figure 2:
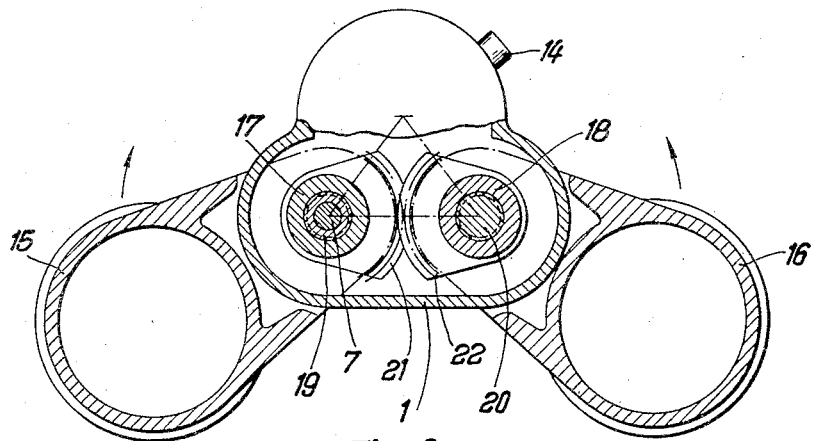
Fig. 2 is a cross-section on line AB, Fig. 1.

The feature of the combination according to the invention is, that the placing of the photo-casing ensures a full and easy use of the telescope as well as of the camera simultaneously. By the arrangement of the shafts and of the objective-axis, forming the corner points of an isosceles triangle as illustrated in Fig. 2 and by the toothed segments 21, 22 the horizontal position of the photographic camera is secured regardless of the distance of pupils. The maintenance of an altitude amounting to at least 0.7 of the basis of the isosceles triangle enables a horizontal film-transport, which ensures an easy handling of the camera. The operation of the camera shutter and the film transport by the fingers of one hand, when using the telescope, is illustrated by Fig. 4.

What we claim is:

A combined binocular and camera arrangement comprising, in combination, a camera having a pair of lateral side edge portions; a pair of telescopes having each an eye piece and an objective being carried by said camera and forming a binocular, said telescopes being respectively located at said lateral side edge portions of said camera and being connected to the latter for respective turning movement about a pair of axes both of which are parallel to the optical axis of the objective of the camera and respectively spaced from the optical axes of said objectives of said telescopes; an axially bored pivot pin being carried by said camera coaxially with one of said turning axes; a pair of film reels adapted to locate a film in a plane passing through said turning axes; and a film winding member extending through said axially bored pivot pin into said camera and operatively connected to one of said film reels for turning the same.

References Cited in the file of this patent

UNITED STATES PATENTS

| 615,229 | Barton | Nov. 29, 1898 |

FOREIGN PATENTS

| 12,148 | Great Britain | of 1912 |
| 534,055 | Germany | Sept. 21, 1931 |
| 956,524 | France | Aug. 8, 1949 |